June 21, 1960     E. L. JENKINS     2,941,334
ELECTRIC GUN FOR GLASS ROLLING MACHINE
Filed Jan. 9, 1958
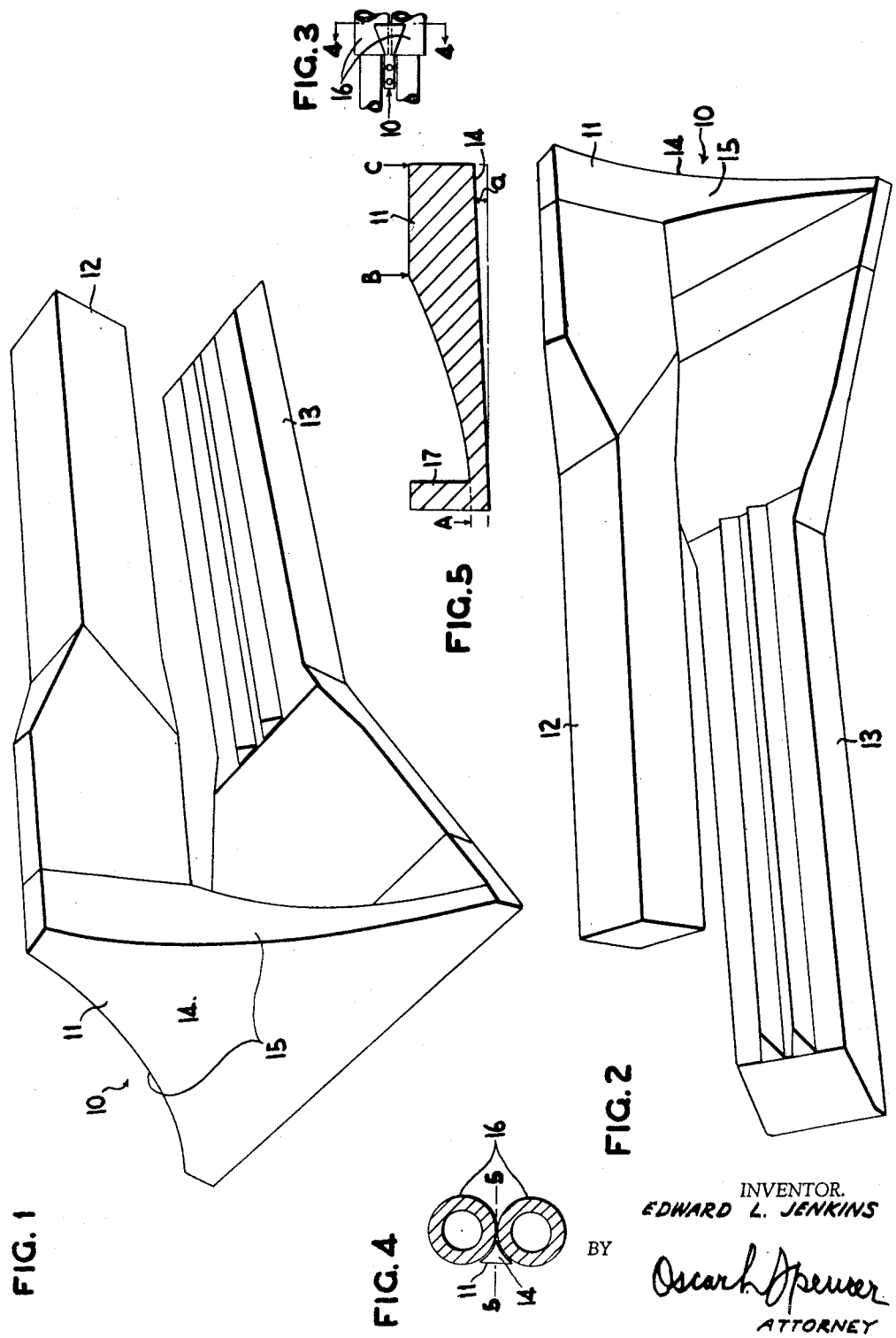
INVENTOR.
EDWARD L. JENKINS
BY
Oscar L. Spencer
ATTORNEY

United States Patent Office 2,941,334
Patented June 21, 1960

2,941,334
ELECTRIC GUN FOR GLASS ROLLING MACHINE

Edward L. Jenkins, Tarentum, Pa., assignor to Pittsburgh Plate Glass Company, Allegheny County, Pa., a corporation of Pennsylvania Filed Jan. 9, 1958, Ser. No. 708,029

4 Claims. (Cl. 49—33)

This application relates to glass rolling apparatus of the general type in which a glass ribbon is formed continuously from a source of molten glass between a pair of forming rolls, and is specifically directed to an improved edge forming member, known in the trade as a "gun," for use with such rolling apparatus.

Edge forming members or guns are broadly old in the art and are used to control and shape the edge contour of the glass ribbon as it issues from between the forming rolls. Such guns are employed to prevent devitrification of the glass edges of the ribbon by preventing the undue chilling of the edges before the ribbon passes into an annealing lehr. Conventional guns are well illustrated and described in United States Patent Numbers 1,954,077, 1,928,023 and 1,928,024, issued respectively to Gelstharp, Koupal, and Koupal et al. The guns shown and described in the above patents are hollow structures heated internally by means of gas flames. Because of their structure and manner of being heated, the temperature along the glass contacting edge or surface of the gun is not uniform, so that the devitrification of the glass edges is possible when the temperature of the gun edge is too low, and improper shaping of the glass edges may occur if the temperature of the gun edges is too high.

It is therefore proposed, by the present invention, to provide an edge gun wherein the temperature of its glass contacting surface is substantially uniform throughout its glass contacting length. This is accomplished by providing a gun which is electrically heated, the gun being employed as a resistance in an electric circuit. The gun is constructed, as will be fully explained, in such a manner that its cross sectional area is substantially uniform throughout its glass contacting length.

Therefore, the invention has among its objects the provision of an improved glass edge forming gun constructed and heated in such a manner that the temperature throughout its glass contacting length is substantially uniform, thereby insuring the prevention of devitrification of a glass edge as the edge is formed by the gun when in contact therewith.

Additional objects and features of the invention will become apparent from the following description taken in connection with the accompanying drawing, in which:

Figures 1 and 2 are isometric views of the gun of this invention in its entirety and looking at the gun from different positions;

Figure 3 is a partial elevation view of the gun showing it properly positioned in relation to one end of the glass ribbon forming rolls;

Figure 4 is a slightly enlarged view taken on line 4—4 of Figure 3; and

Figure 5 is a cross sectional view of the glass contacting portion of the gun taken on the plane of the glass ribbon substantially along the line 5—5 of Figure 4.

Before describing the gun of this invention in detail, it is to be understood that a pair of these guns, each positioned for contacting an edge of the glass ribbon, are employed. However, the construction of each gun is identical, the only difference being in their position relative to the forming rolls, so that a description of one gun is deemed sufficient.

The edge forming member or gun of this invention, generally identified by the reference character 10, comprises a glass contacting portion 11 and extending bus bars 12 and 13, the gun in its entirety being constructed of a suitable metal, so that when connected in an electric circuit, the bus bars 12 and 13 will conduct current to the portion 11, which portion becomes heated due to its resistance to the passage of the electric current. The bus bars 12 and 13 are suitably joined, as by welding, to the portion 11.

The glass contacting portion 11 has a glass contacting surface 14 and, as will be explained, is constructed in such a manner as to have a substantially uniform resistance along its glass contacting length. The bus bars 12 and 13 are quite large in cross section, so as not to become heated due to their resistance before the portion 11.

The portion 11 is suitably contoured, as at 15, to be placed closely adjacent the peripheries of a pair of glass forming rolls 16, 16 (see Figures 3 and 4), so as to close the substantially V-shaped space at the roll ends, and away from the glass furnace, not illustrated. As previously mentioned, a gun is disposed at each end of the forming rolls. Since the forming rolls are conventional no detailed description is deemed necessary.

Referring now to Figure 5, the portion 11 is so contoured that the cross sectional area at any location between the points A and C is constant, thereby insuring, when electric current is passed therethrough, a uniform temperature between the points A and C. The cross sectional area of the portion 12 is larger so that in this area the gun will provide a slightly lower resistance to the passage of the electric current and therefore will become heated to a lower temperature due to its resistance. Initial contact of the glass occurs in the area between points C and A and in that direction, so that the slightly lower temperature produces the initial desired glass ribbon edge.

The glass contacting surface 14 is angularly disposed to a plane perpendicular to an axis of one of the forming rolls 16, 16, so as to control the width and edge shape of the glass ribbon as it issues from between the rolls. The angle from such a plane is identified in the drawing as $a$.

It will be noted that the trailing edge of the portion 11 is provided with an extending flange 17 throughout its width and the bus bar 13 is attached to this flange. If the bus bar 13 were attached directly to the portion 11 and not through a flange, the welded joint would affect the resistance of the portion 11, so that a substantially uniform temperature would not be obtained when current passes through the portion 11. Such nonuniform temperature, as now will be understood, could defeat the purpose of the gun of this invention.

To more fully point out the structure of the gun of this invention, an actual gun will now be described for use with forming rolls having a diameter of approximately 19 inches. For this size forming roll, the glass contacting surface between the points A and C is 6 1/16 inches long, the distance between A and B along the ribbon of glass is 4 1/16 inches and the distance between B and C along the length of the glass is 2 inches. The cross sectional area of the portion 11 between the points A and C is a constant 2.5 square inches.

Operating at 5,500 amperes with a 2-volt drop across the gun, such a gun reaches a temperature along the surface or in the portion 11 of 2,000° F., which is sufficient to form the edge of the glass and to prevent devitrification thereof.

What I claim is:

1. In a glass ribbon rolling apparatus which includes a pair of forming rolls, the improvement comprising an electrically heated metal gun at each end of the pair of rolls closing the end of the substantially V-space between the rolls, each said gun having a substantially triangularly-shaped surface positioned to contact and shape an edge of the glass ribbon formed between the rolls, each said gun having a substantially constant cross sectional area in planes substantially normal to said surface, said substantially constant cross sectional area insuring a substantially uniform temperature along said surface, and means for electrically heating each gun.

2. In a glass ribbon rolling apparatus which includes a pair of forming rolls, the improvement comprising an electric resistance metal gun at each end of the pair of rolls closing the end of the substantially V-space between the rolls, each said gun having a substantially triangularly-shaped surface positioned to contact and shape an edge of the glass ribbon formed between the rolls, each said gun having a substantially constant cross sectional area in planes substantially normal to said surface, said substantially constant cross sectional area providing a substantially uniform resistance to the passage of electric current and insuring a substantially uniform heating along said surface due to the resistance, and means to pass an electric current through said gun.

3. In a glass ribbon rolling apparatus which includes a pair of forming rolls, the improvement comprising an electric resistance heated metal gun at each end of the pair of rolls closing the end of the substantially V-space between the rolls, each gun having a substantially triangularly-shaped surface positioned to contact and shape an edge of said glass, each gun having a substantially constant cross sectional area in planes substantially normal to said surface, said substantially constant cross sectional area providing a substantially uniform resistance to the passage of electric current and insuring a substantially uniform heating along said surface due to the resistance, said glass contacting surface being angularly disposed relative to a plane perpendicular to an axis of one of said rolls, and means to pass an electric current through said gun.

4. In a glass ribbon rolling apparatus which includes a pair of forming rolls, the improvement comprising an electric resistance heated metal gun at each end of the pair of rolls closing the end of the substantially V-space between the rolls, each gun having a substantially triangularly-shaped surface positioned to contact and shape an edge of said glass, each gun having a substantially constant cross sectional area in planes substantially normal to said surface, said substantially constant cross sectional area providing a substantially uniform resistance to the passage of electric current insuring a substantially uniform heating along said surface due to the resistance, said glass contacting surface being angularly disposed relative to a plane perpendicular to an axis of one of said rolls, and means to pass an electric current through said gun, said means to pass an electric current through said gun including a pair of bus bars of such cross sectional area as to provide relatively little resistance to the passage of current therethrough.

References Cited in the file of this patent

UNITED STATES PATENTS

| | | |
|---|---|---|
| 1,519,314 | Koupal | Dec. 16, 1924 |
| 1,560,078 | Gelstharp | Nov. 3, 1925 |
| 2,165,318 | Thomas et al. | July 11, 1939 |